(12) United States Patent
Quinlan

(10) Patent No.: US 7,062,660 B2
(45) Date of Patent: Jun. 13, 2006

(54) METHOD AND APPARATUS FOR CONTROLLING THE PERFORMANCE OF A FILE SYSTEM MOUNT OPERATION BY A USER LACKING SUPERUSER AUTHORITY

(75) Inventor: Joseph Quinlan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 09/922,618

(22) Filed: Aug. 6, 2001

(65) Prior Publication Data

US 2003/0028508 A1    Feb. 6, 2003

(51) Int. Cl.
*G06F 15/177* (2006.01)
*H04L 9/00* (2006.01)

(52) U.S. Cl. .................. 713/200; 713/100; 713/1; 713/182; 713/183; 707/9

(58) Field of Classification Search ............ 713/100, 713/151, 1, 182, 183, 164, 165, 200; 707/4, 707/9, 7
See application file for complete search history.

(56) References Cited

U.S. PATENT DOCUMENTS

| | | |
|---|---|---|
| 5,001,628 A | 3/1991 | Johnson et al. |
| 5,838,910 A | 11/1998 | Domenikos et al. |
| 5,838,916 A | 11/1998 | Domenikos et al. |
| 5,946,685 A | 8/1999 | Cramer et al. |
| 6,052,785 A | 4/2000 | Lin et al. |
| 6,115,741 A | 9/2000 | Domenikos et al. |

FOREIGN PATENT DOCUMENTS

| | | |
|---|---|---|
| EP | 0325777 A2 | 8/1999 |
| GB | 2228599 A | 8/1990 |
| JP | 5250249 A | 9/1993 |
| JP | 8006839 A | 1/1996 |

OTHER PUBLICATIONS

Lee, "How to Mount/Unmount for Users," Linux Gazette, Issue #17, May 1997.*
Man et al., "Chapter 4: Filesystem Restrictions," Linux System Security: The Administrator's Guide to Open Source Secrity Tools, Pearson Educational Publishers, Sep. 18, 2002.*
UNIX System Security, D.A. Curry, 1992, pp. 96-97.
The UNIX Operating System, K. Christian, 1988, pp. 49-62 and pp. 344-345.

(Continued)

*Primary Examiner*—Gregory Morse
*Assistant Examiner*—John Elmore
(74) *Attorney, Agent, or Firm*—William A. Kinnaman, Jr.

(57) ABSTRACT

A method and apparatus for controlling the performance of a mount operation changing the logical association of a first file system with a second file system of an information handling system by a user who may not have general authority to perform such a mount operation. In response to a request by a user to perform a requested mount operation on the first file system, a determination is made of whether the user has general authority to perform the requested mount operation, either because the user has general superuser authority or because the user has superuser authority for mount operations. If the user has general authority to perform the requested mount operation, the requested mount operation is performed. If the user does not have general authority to perform the requested mount operation, the requested mount operation is performed only if the user has a predetermined access authority to the first file system.

21 Claims, 4 Drawing Sheets

OTHER PUBLICATIONS

Modern Operating Systems, A.S. Tannenbaum, 1992, pp. 265-314.

OS/390 UNIX System Services Planning, Mar. 2000, SC28-1890-09.

OS/390 UNIX System Services Command Reference, Mar. 2000, SC28-1892-09.

zOS UNIX System Services Planning, Mar. 2001, GA22-7800-00.

OS/390 UNIX System Services Programming: Assembler Callable Services Reference, Mar. 2000, SA22-7803-00.

z/OS UNIX Systems Services Programming: Assembler Callable Services Reference, Mar. 2001, SA22-7803-00.

z/OS UNIX Systems Services Command Reference, Mar. 2001, SA22-7802-00.

OS/390 Security Server (RACF) General User's Guide, Sep. 1999, SC28-1917-06.

z/OS Secure Way Security Server (RACF) General User's Guide, Mar. 2001, SA22-7685-00.

OS/390 Security Server (RACF) Callable Services, Sep. 1999, GC28-1921-06.

z/OS Secure Way Security Server (RACF) Callable Services, Mar. 2001, SA22-7691-00.

z/OS UNIX System Services; Security Sampler, Jul. 2001; pp. 1-19.

* cited by examiner

METHOD AND APPARATUS FOR CONTROLLING THE PERFORMANCE OF A FILE SYSTEM MOUNT OPERATION BY A USER LACKING SUPERUSER AUTHORITY

BACKGROUND OF THE INVENTION

1. Field of the Invention

This invention relates to a method and apparatus for controlling the performance of a file system mount operation in an information handling system by a user lacking superuser authority. More particularly, it relates to a method and apparatus for controlling the performance of a mount or unmount operation by such a user on a UNIX file system.

2. Description of the Related Art

1. Introductory Discussion

As a preliminary to discussing the problem to which the present invention is directed, it will be useful to discuss some basic notions relating to operating systems, file systems and mount operations.

Operating systems are the software components that perform basic system services for application programs running on a computer system. Among other things, operating systems manage the use by application programs of various system resources such as data files, executable program files, hardware resources such as processors and memory, and the like. An important subset of operating systems is that of UNIX-based operating systems, so called because they conform in varying degrees to a set of standards established by the original operating system of that name created at AT&T Bell Laboratories. UNIX-based operating systems are discussed in more detail in such publications as K. Christian, *The UNIX Operating System* (1988), and A. S. Tanenbaum, *Modern Operating Systems* (1992), especially at pages 265–314, both of which publications are incorporated herein by reference.

Operating systems use file systems to organize data and program files so that they may accessed by applications. File systems generally are discussed in the above-identified reference of Tanenbaum (1992) at pages 145–204; UNIX file systems in particular are discussed in the above-identified reference of Christian (1988) at pages 49–62, as well as in Tanenbaum at pages 287–290.

In a hierarchical file system (HFS), files are logically contained in directories, each of which may be either a root directory or a subdirectory contained in a parent directory. Thus, referring to FIG. 1, in an example taken from pages 288–289 of Tanenbaum, a file system 100 on a hard disk may contain a root directory (/), which may contain subdirectories a and b, with subdirectory a in turn containing subdirectories c and d. Subdirectory c may contain files p and q, while subdirectory d may contain a file r. In a similar manner, a file system 102 on a diskette may contain a root directory (/) containing files x, y and z. In general, each directory may contain zero or more subdirectories and zero or more files. To uniquely specify a file within a given hierarchical file system, the full path name, with the chain of subdirectories from the root directory, is used. Thus, file r is more fully identified as /a/d/r.

In each of the file systems 100 and 102, the root directory of the file system is the root directory on the corresponding drive. More generally, any directory on a drive, along with its dependent directories and files, can be regarded as a file system in its own right. This, on the hard disk in FIG. 1, the file system /a would contain files p, q and r, while the file system /a/d would contain file r.

Hierarchical file systems have the advantage over "flat" file systems that they allow one to keep related files with one another and separated from unrelated files. However, one will note that in FIG. 1 there is no logical association between hard disk file system 100 and the diskette file system 102; rather, they are separate file systems with their separate directory structures. Thus, to fully specify one of the files shown in FIG. 1, a user would have to identify not only the location of the file within its file system (using the path name as indicated above), but also the file system (usually by a drive letter) as well. Accordingly, if H: were the drive letter associated with the hard disk file system 100 and D: were the drive letter associated with the diskette file system 100, file r might be fully specified as H:/a/d/r, while file x might be fully specified as D:/x.

To avoid this need to specify a file system, UNIX employs a concept known as mounting, in which an entire first file system is placed (or "mounted", to use the UNIX terminology) with its hierarchical tree structure intact in a directory of a second file system, so that all files can be referenced from within a single file system. Thus, the file system 102 of FIG. 1 can be placed in subdirectory b (the "mount point") to create the single file system 200 shown in FIG. 2. In this single file system 200, file r can be referenced as /a/d/r, and file x as /b/x, without any need to specify a file system.

The mount operation described above would typically be initiated by a user entering a shell command known as a mount command from a keyboard of an operator console or the user's workstation. To reverse the mount operation, the user would enter an unmount command.

To summarize, mounting a file system logically associates it with another file system so that it can be referenced from within the other file system, while unmounting a file system logically dissociates it from another file system so that it can no longer be referenced from within the other file system. The term "mount operation", as used generically herein, refers to either of these operations, as well as any other operation that changes the logical association of a first file system with a second file system (as by moving the mount point within the second file system or to a different file system).

2. Problem Statement

The present invention is directed to the problem of controlling just which users are allowed to initiate a particular mount operation in a computer system. The problem is presented below as it exists in the UNIX System Services (USS) component of the IBM OS/390 and z/OS operating systems, however a similar problem would exist in other systems as well.

In UNIX-based operating systems, each user authenticated to the system has a user ID (UID) identifying the specific user, as well as a group ID (ID) identifying a group of which the user is a member. These IDs determine what a given user can do with a given system resource. The UID of 0 is assigned to what is known as a root user or superuser, and a user authenticated to the system with the UID of 0 is said to have root or superuser authority. Since such a superuser has extremely broad authority to access and update system resources, security dictates that the number of persons allowed to be superusers be kept quite small.

Currently UNIX System Services supports two ways of granting authority to users to perform mount operations. Thus, a user with root authority (UID=0) can perform mount operations, since that is one attribute of his broad superuser authority. In addition, a user with at least read access to a resource SUPERUSER.FILESYS.MOUNT, as defined by a resource profile of that name, can also mount and unmount file systems; such a user has superuser authority for mount operations, even though he may not have superuser authority generally. This use of the SUPERUSER.FILESYS.MOUNT resource profile to control mount operations is described in such IBM publications as *OS/390 UNIX System Services Planning*, SC28-1890-09 (March 2000), and *OS/390 UNIX System Services Command Reference*, SC28-1892-09 (March 2000), both of which are incorporated herein by reference.

Both of these approaches give the user authority to perform mount operations on all file systems. However, in large UNIX installation there may be several different departments or organizations. It would be useful if particular subsets of users at such installations could perform mount operations on their own file systems. Under the authorization scheme described above, though, this is not possible without giving such users general mount authority (either general superuser authority or superuser authority for mount operations), which would let them perform mount operations other file systems as well.

SUMMARY OF THE INVENTION

The present invention relates to a mechanism for allowing non-root users the ability to perform mount operations on file systems, especially on a UNIX-based platform. More particularly, the present invention contemplates a method and apparatus for controlling the performance of a mount operation changing the logical association of a first file system with a second file system of an information handling system by a user who may not have general authority to perform such a mount operation. In response to a request by a user to perform a requested mount operation on the first file system, a determination is made of whether the user has general authority to perform the requested mount operation, either because the user has general superuser authority or because the user has superuser authority for mount operations. If the user has general authority to perform the requested mount operation, the requested mount operation is performed. If the user does not have general authority to perform the requested mount operation, the requested mount operation is performed only if the user has a predetermined access authority to the first file system.

The present invention distributes mount authority among users without superuser authority. It thus allows a large UNIX organization to distribute mount privileges to various individuals in the organization on a per file system basis.

DESCRIPTION OF THE PREFERRED EMBODIMENT

Figure 1:
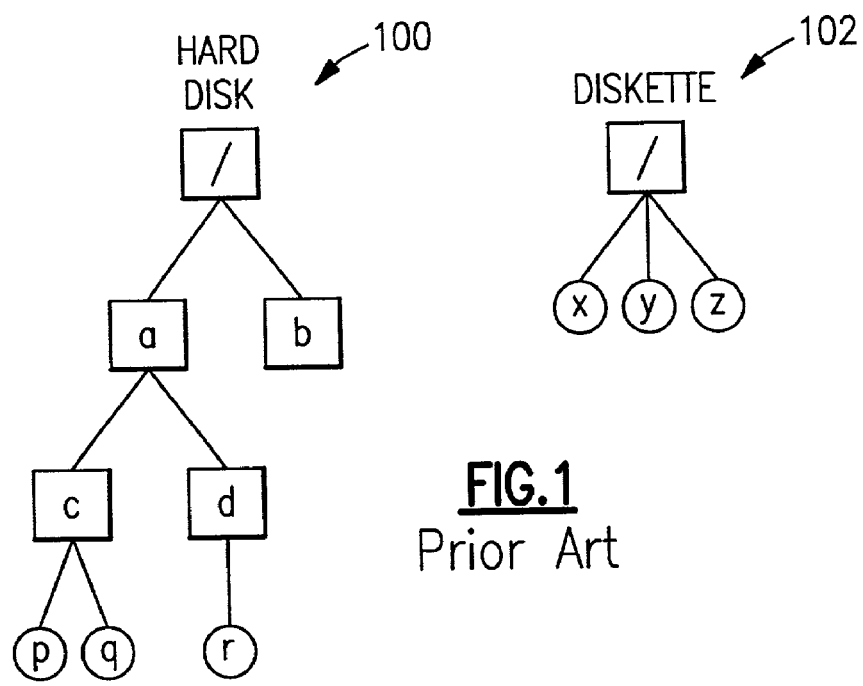
FIG. 1 shows a first file system before it is mounted in a second file system.
Figure 2:
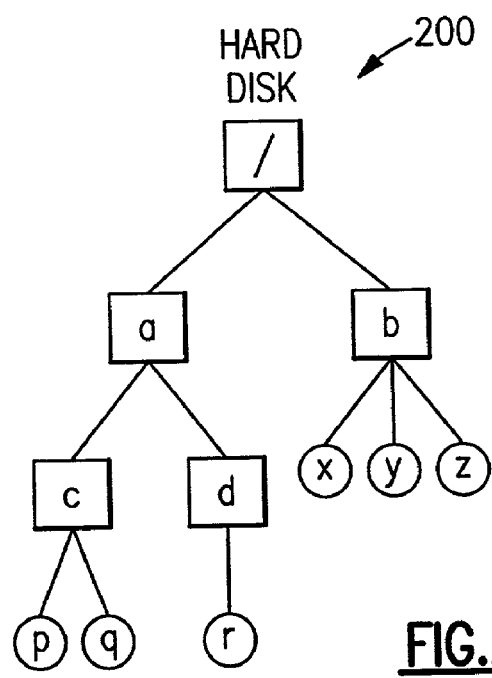
FIG. 2 shows the first file system of FIG. 1 after it is mounted in the second file system.
Figure 3:
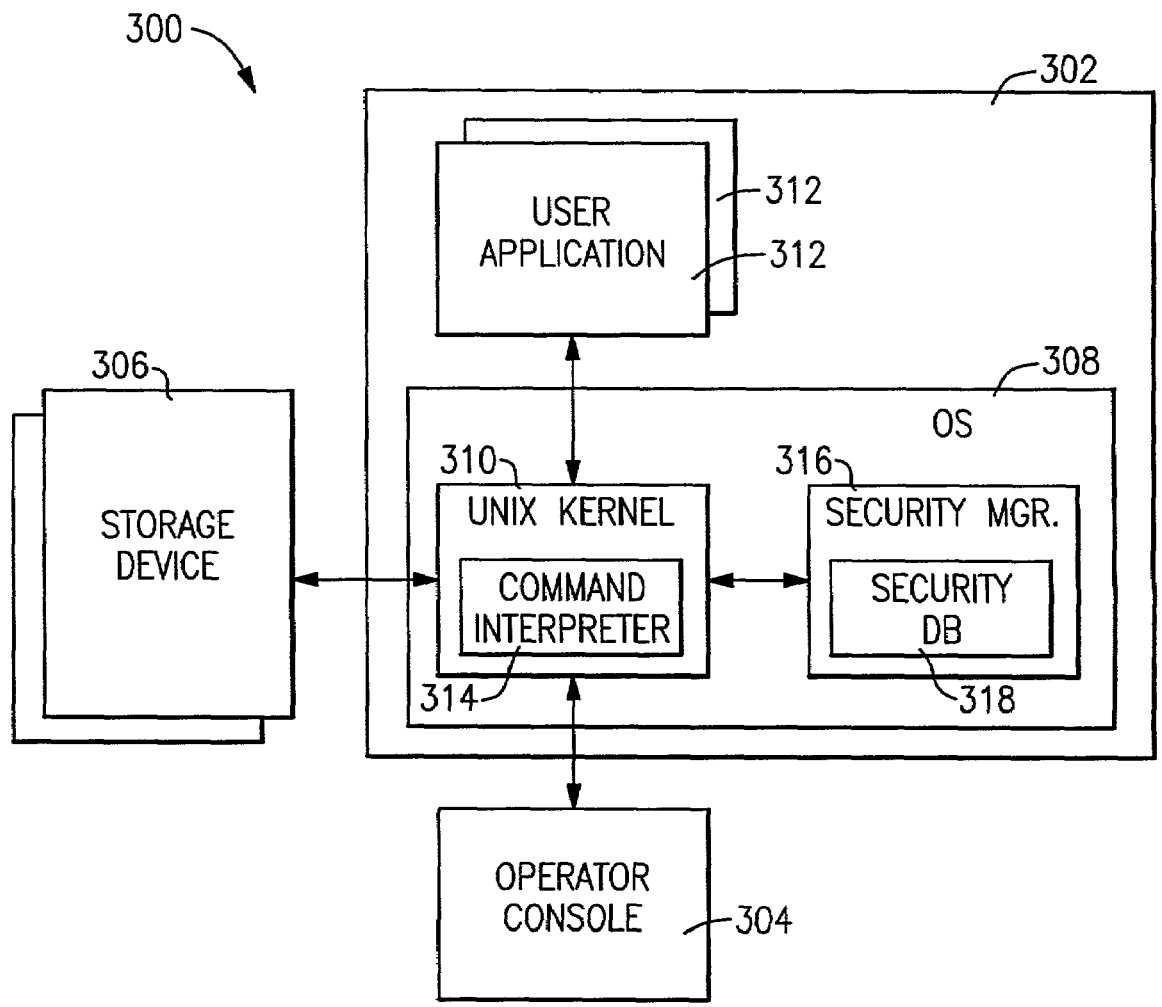
FIG. 3 shows an information handling system incorporating the present invention.

FIG. 3 is a schematic block diagram of an information handling system 300 incorporating the present invention. Information handling system 300 comprises a central processor complex (CPC) 302 to which an operator console 304 is attached. As is well known in the art, CPC 302 contains one or more central processors (CPs) as well as central storage for storing data currently being handled and programs currently being executed. Attached to CPC 302 are storage devices 306 of various types, typically direct access storage devices (DASD) such as fixed disk drives ("hard drives"), diskette drives ("floppy drives") and the like. Although not shown in FIG. 3, CPC 302 would typically also be attached to various other peripheral input/output (I/O) devices such as printers, communication networks and the like.

Console 304 comprises an input device such as a keyboard for entering operator commands (such as the ones described below) as well as an output device such as a monitor for displaying messages or responses to commands. Console 304 may comprise a personal computer (PC) that is attached to CPC 302 either directly or through a service processor not separately shown. Although the disclosed embodiment uses a command-line interface in which commands are entered explicitly via a keyboard, other methods of entering commands—e.g., using a mouse and a graphical user interface (GUI)—could be used instead, and the term "command" is to be understood in this generalized sense.

Executing on CPC 302 are one or more system images (one of which is shown), each of which comprises an operating system (OS) 308. Although the invention is not limited to any particular platform, in the embodiment shown CPC 302 may comprise an IBM S/390 or eServer zSeries server, while OS 308 may comprise the IBM OS/390 or z/OS operating system. (zSeries and z/OS are recently introduced products having a 64-bit addressing mode; S/390 and OS/390 are predecessor products having 31-bit and 24-bit addressing modes.) Each of these operating systems 308 has a UNIX System Services (USS) component 310 (also referred to hereinafter as the UNIX kernel) that performs UNIX functions for user applications 312 executing on the system image. UNIX kernel 310 contains, among other components, a command interpreter 314 for executing so-called shell commands entered via the operator console 304.

USS component 310 is described more particularly in the IBM publications *OS/390 UNIX System Services Planning*, SC28-1890-09 (March 2000), and *z/OS UNIX System Services Planning*, GA22-7800-00 (March 2001), incorporated herein by reference. The callable services provided by USS component 310 are described in the IBM publications *OS/390 UNIX System Services Programming: Assembler Callable Services Reference*, SC28-1899-08 (March 2000), and *z/OS UNIX System Services Programming: Assembler Callable Services Reference*, SA22-7803-00 (March 2001), incorporated herein by reference, while the shell commands executed by USS component 310 (including mount and unmount) are described more particularly in the IBM publications *OS/390 UNIX System Services Command Reference*, SC28-1892-09 (March 2000), and *z/OS UNIX System Services Command Reference*, SA22-7802-00 (March 2001), incorporated herein by reference.

The present discussion is principally with reference to mount operations performed in response to the mount and unmount UNIX shell commands. However, the invention is not limited to mount operations initiated in this manner, and other means could be used instead. Thus, in the system 300 shown, mount operations may be initiated by a user application 312 using one of the callable services mount( ), _mount( ) and unmount( ) provided by the UNIX kernel 310, as described in the above-identified publications *OS/390 UNIX System Services Programming: Assembler Callable Services Reference and z/OS UNIX System Services Programming: Assembler Callable Services Reference*. In addition, in the system 300 shown a user can initiate a mount operation from outside of the UNIX environment by issuing a Time Sharing Options Extended (TSO/E) command MOUNT or UNMOUNT, as described in the above-identified publications *OS/390 UNIX System Services Command Reference and z/OS UNIX System Services Command Reference*. Similar principles would govern the authorization checking in accordance with the present invention for mount requests received through these alternative channels.

In addition to performing various system services for applications 312, UNIX kernel 310 manages their access to and use of various system resources. To assist it in this respect, UNIX kernel 310 uses the services of a system software component 316 referred to herein as a security manager. Security manager 316 authenticates users to the system and controls their access to protected resources through the use of resource profiles to be described stored in a security database 318. Although the particular choice of security manager 316 forms no part of the present invention, in the disclosed embodiment the Resource Access Control Facility (RACF) component of the Security Server element of the IBM OS/390 or z/OS operating system is used. The RACF component is described more particularly in such IBM publications as *OS/390 Security Server (RACF) General User's Guide*, SC28-1917-06 (September 1999), *z/OS SecureWay Security Server RACF General User's Guide*, SA22-7685-00 (March 2001), *OS/390 Security Server (RACF) Callable Services*, GC28-1921-06 (September 1999), and *z/OS SecureWay Security Server RACF Callable Services*, SA22-7691-00 (March 2001), all of which are incorporated herein by reference.

Figures 4, 5, 6:
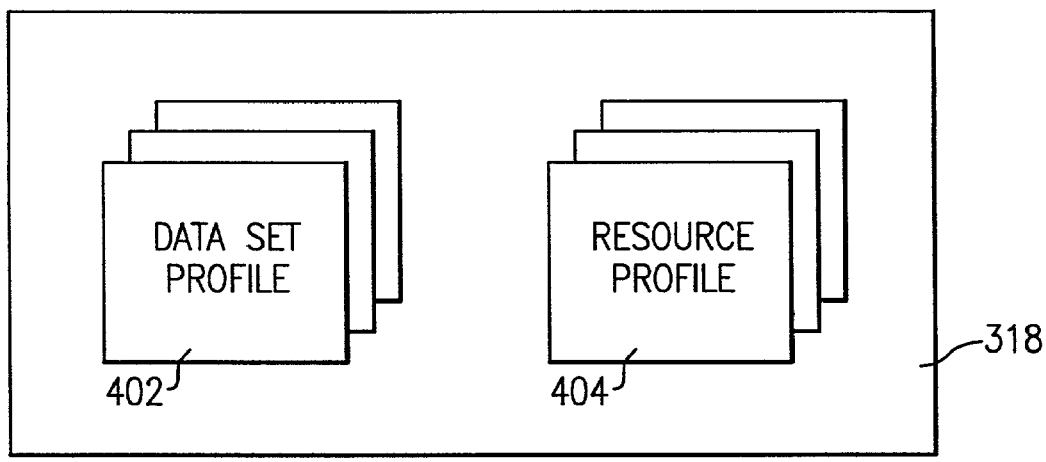
FIG. 4 shows the security database maintained by the security manager shown in FIG. 3.
FIG. 5 shows a resource profile.
FIG. 6 shows an access list.

FIG. 4 shows the various profiles used by security manager 316 to control access to protected resources. As shown in the figure, these profiles, which are maintained in the security database 318, include data set profiles 402 and resource profiles 404. Each data set 402 profile may be either a discrete profile or a generic profile. Each discrete profile 402 controls access to a single data set that has unique security requirements (such as, for example, a file system), while each generic profile 402 controls access to multiple data sets that have common security requirements.

Each resource profile 404, on the other hand, controls access to a general system resource such as disk or tape volumes, program load modules, application resources, terminals and other resources that may be installation defined. As described in the RACF publications referred to above, in the particular security manager 316 shown, resource profiles 404 are organized into classes, one of which (UNIXPRIV) contains profiles that are used to grant UNIX privileges. One of the profiles in the UNIXPRIV class is the previously mentioned SUPERUSER.FILESYS.MOUNT, which allows a user to perform various mount operations.

FIG. 5 shows the contents of a data set profile 402 or a resource profile 404 in the embodiment shown. As shown in the figure, each profile 402 or 404 contains the name 502 of the data set or resource, the owner 504 of the data set or resource, an access list 506, a universal access authority (UACC) 507, and auditing information 508.

The access list 506 specifies the access authority for particular users and groups, that is, the access allowed by such users and groups to the data set or resource defined by the profile 402 or 404. FIG. 6 shows the contents of the access list 506. As shown in the figure, the access list 506 contains one or more entries 602, each of which contains the name 604 of a user or group and the access authority 606 given to that user or group. In the embodiment shown, the access authority for a particular user or group may be NONE, READ, UPDATE, CONTROL, ALTER, or (for programs) EXECUTE.

The universal access authority (UACC) 507 specifies the default access authority, that is, the access authority for a user or group not listed in the access list 506. Like the access authority 606 for a particular user or group, the universal access authority (UACC) 507 may be NONE, READ, UPDATE, CONTROL, ALTER, or (for programs) EXECUTE.

Figure 7:
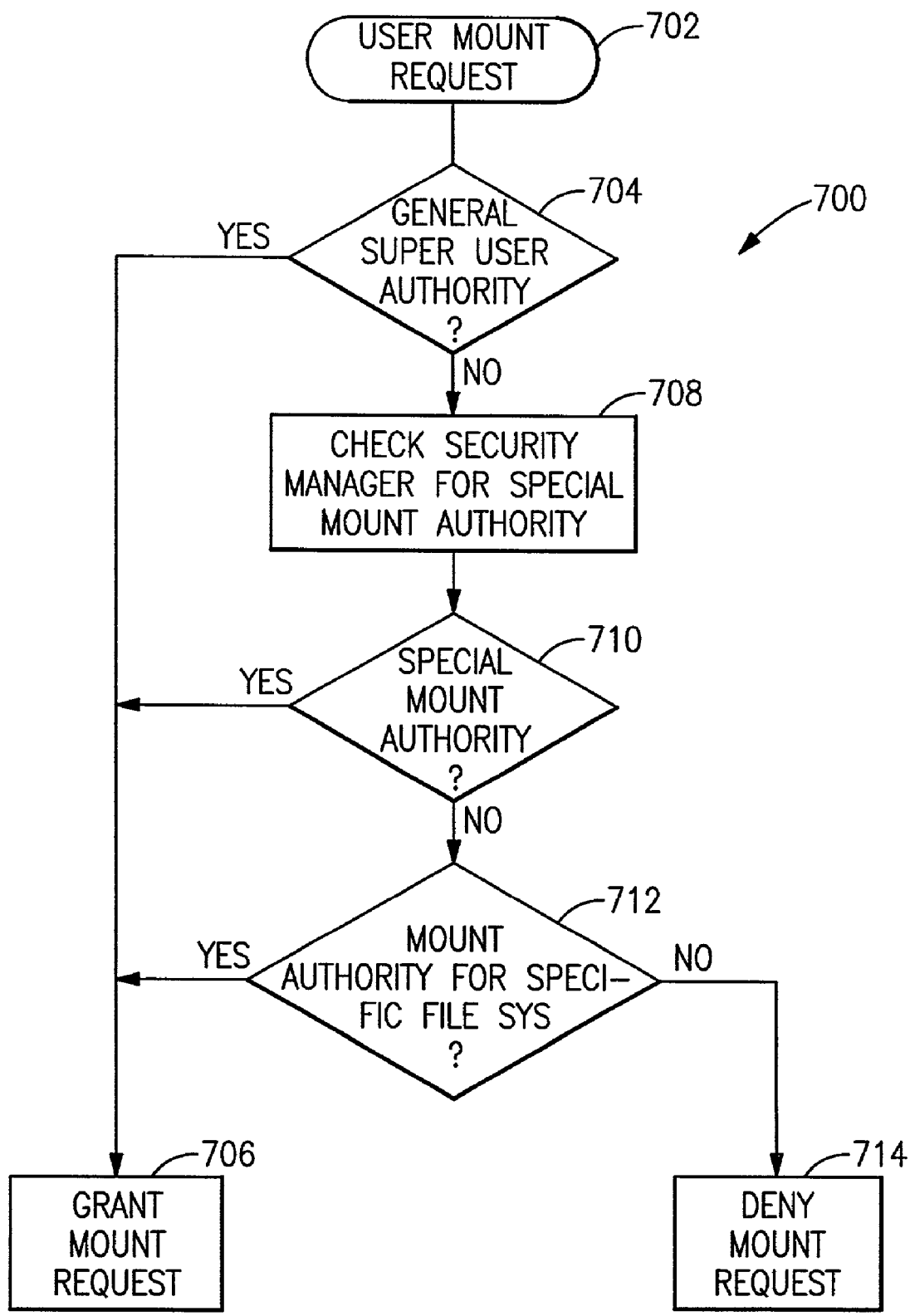
FIG. 7 shows the procedure for handling a user mount request.

FIG. 7 shows the procedure 700 for checking mount authority in accordance with the present invention. The procedure 700, which is performed by the UNIX kernel 310, is invoked when a user makes a mount or unmount request, as by entering a mount or unmount UNIX shell command (step 702). Upon receiving such a request, the procedure 700 determines, by checking the user ID of the requester, whether the user has general superuser, or root, authority (UID=0) (step 704). If so, then the procedure 700 grants the mount request and allows the mount to occur (step 706).

If at step 704 it is determined that the user does not have general superuser authority, then the procedure 700 checks the security manager 316 to determine whether the user has general mount authority, that is, superuser authority for mount operations (step 708). This is done by examining the SUPERUSER.FILESYS.MOUNT resource profile 404 in the UNIXPRIV class of the security database 318 and determining whether the user has at least READ access authority (as indicated by the access list 506 and UACC 507). If it is determined that the user does have general mount authority (step 710), then the procedure 700 grants the mount request and allows the mount to occur (step 706).

As described in the UNIX System Services publications referred to above, the particular level of access authority the user has determines whether the mount operation is permitted to occur with the setuid option, in which the setuid bits of files in the file system being mounted are given effect, or only with the nosetuid option, in which the setuid bits of files in the file system being mounted are ignored. If the user has READ access to the SUPERUSER.FILESYS.MOUNT resource, the mount operation is permitted to occur with the nosetuid option only; if, on the other hand, the user has UPDATE access, the mount operation is also permitted to occur with the setuid option. (The setuid bit is also discussed in Tanenbaum, supra, at pages 283–284 and in Christian, supra, at pages 344–345. The setuid/nosetuid option as it applies to mount operations is also described in D. A. Curry, *UNIX System Security* (1992), incorporated by reference herein, at pages 96–97.)

If at step 710 it is determined that the user does not have general mount authority, the procedure 700 determines whether the user has mount authority for the specific file system being mounted (step 712). This is done by examining the data set profile 402 for the data set corresponding the target file system (i.e., the file system being mounted in or unmounted from the other file system) in the security database 318 and determining whether the user either owns the file system (as indicated by the owner field 502) has at least READ access authority to that file system (as indicated by the access list 506 and UACC 507); the data set profile 402 examined may be either for the target file system itself or for a data set containing the target file system. If the user does own the target file system or have at least READ access authority to that file system, then the procedure 700 allows the mount to occur (step 706); preferably here, the mount is allowed to occur with the setuid option only if the user owns the target file system. If the user does not own the target file system or have at least READ access authority to that file system, then the procedure 700 denies the mount request and does not allow the mount to occur (step 714).

In the embodiment shown, the access authority checked is for the target file system itself (or for a data set containing the target file system). Alternatively, one could determine the user's access authority to the target file system checking his access authority to specific files within that file system. For example, one could determine the owner of the root file within the target file system and, if the user making the mount request is also the owner of that file, then the mount would be allowed without the need for root authority.

While a particular embodiment has been shown and described, various modifications will be apparent to those skilled in the art. Thus, while the description made particular reference to UNIX-based operating systems, the invention could be used in other operating systems as well.

What is claimed is:

1. A method for controlling the performance of a mount operation changing the logical association of a first file system with a second file system of an information handling system by a user who may not have general authority to perform such a mount operation, the method comprising the steps of:

specifying a subset of users having a predetermined access authority to the first file system;

in response to a request by a user to perform a requested mount operation on the first file system, determining whether the user has general authority to perform the requested mount operation;

if the user has general authority to perform the requested mount operation, performing the requested mount operation; and if the user does not have general authority to perform the requested mount operation, determining whether the user is one of the subset of users having the predetermined access authority to the first file system; and performing the requested mount operation if the user is one of the subset of users having the predetermined access authority to the first file system.

2. The method of claim 1 in which the requested mount operation logically associates the first file system with the second file system.

3. The method of claim 1 in which the requested mount operation logically dissociates the first file system from the second file system.

4. The method of claim 1 in which the step of determining whether the user has general authority to perform the requested mount operation comprises the step of determining whether the user has general superuser authority.

5. The method of claim 1 in which the step of determining whether the user has general authority to perform the requested mount operation comprises the step of determining whether the user has superuser authority for mount operations.

6. Apparatus for controlling the performance of a mount operation changing the logical association of a first file system with a second file system of an information handling system by a user who may not have general authority to perform such a mount operation, comprising:

means for specifying a subset of users having a predetermined access authority to the first file system;

means responsive to a request by a user to perform a requested mount operation on the first file system for determining whether the user has general authority to perform the requested mount operation;

means for performing the requested mount operation if the user has general authority to perform the requested mount operation; and means for:

determining whether the user is one of the subset of users having the predetermined access authority to the first file system; and performing the requested mount operation if the user is one of the subset of users having the predetermined access authority to the first file system if the user does not have general authority to perform the requested mount operation.

7. The apparatus of claim 6 in which the requested mount operation logically associates the first file system with the second file system.

8. The apparatus of claim 6 in which the requested mount operation logically dissociates the first file system from the second file system.

9. The apparatus of claim 6 in which the means for determining whether the user has general authority to perform the requested mount operation comprises means for determining whether the user has general superuser authority.

10. The apparatus of claim 6 in which the means for determining whether the user has general authority to perform the requested mount operation comprises means for determining whether the user has superuser authority for mount operations.

11. A program storage device readable by a machine, tangibly embodying a program of instructions executable by the machine to perform method steps for controlling the performance of a mount operation changing the logical association of a first file system with a second file system of an information handling system by a user who may not have general authority to perform such a mount operation, the method steps comprising:

specifying a subset of users having a predetermined access authority to the first file system;

in response to a request by a user to perform a requested mount operation on the first file system, determining whether the user has general authority to perform the requested mount operation;

if the user has general authority to perform the requested mount operation, performing the requested mount operation; and if the user does not have general authority to perform the requested mount operation, determining whether the user is one of the subset of users having the predetermined access authority to the first file system; and performing the requested mount operation if the user is one of the subset of users having the predetermined access authority to the first file system.

12. The program storage device of claim 11 in which the requested mount operation logically associates the first file system with the second file system.

13. The program storage device of claim 11 in which the requested mount operation logically dissociates the first file system from the second file system.

14. The program storage device of claim 11 in which the step of determining whether the user has general authority to perform the requested mount operation comprises the step of determining whether the user has general superuser authority.

15. The program storage device of claim 11 in which the step of determining whether the user has general authority to perform the requested mount operation comprises the step of determining whether the user has superuser authority for mount operations.

16. The method of claim 1 in which the file system has an owner and the specified subset of users is the owner of the first file system.

17. The method of claim 1 in which the specified subset of users is the set of users having read access authority to the first file system.

18. The apparatus of claim 6 in which the file system has an owner and the specified subset of users is the owner of the first file system.

19. The apparatus of claim 6 in which the specified subset of users is the set of users having read access authority to the first file system.

20. The program storage device of claim 11 in which the file system has an owner and the specified subset of users is the owner of the first file system.

21. The program storage device of claim 11 in which the specified subset of users is the set of users having read access authority to the first file system.

* * * * *